United States Patent [19]

Kobayashi et al.

[11] Patent Number: 4,680,973
[45] Date of Patent: Jul. 21, 1987

[54] ELECTROMAGNETIC FLOW METER CONVERTER

[75] Inventors: Tamotsu Kobayashi; Shigeru Goto; Hironobu Ohta; Takashi Torimaru, all of Tokyo, Japan

[73] Assignee: Yokogawa Hokushin Electric Corporation, Tokyo, Japan

[21] Appl. No.: 781,958

[22] Filed: Sep. 30, 1985

[30] Foreign Application Priority Data

Oct. 25, 1984 [JP] Japan ............................ 59-224875
Nov. 30, 1984 [JP] Japan ........................ 59-182043[U]

[51] Int. Cl.[4] .............................................. G01F 1/60
[52] U.S. Cl. ................................................. 73/861.16
[58] Field of Search ................ 73/3, 861.16, 861.17; 324/115

[56] References Cited

U.S. PATENT DOCUMENTS

| | | | |
|---|---|---|---|
| 4,089,219 | 5/1978 | Suzuiki | 73/861.16 |
| 4,309,909 | 1/1982 | Grebe, Jr. et al. | 73/861.16 X |
| 4,325,261 | 9/1982 | Freund, Jr. et al. | 73/861.16 X |

Primary Examiner—Herbert Goldstein
Attorney, Agent, or Firm—Moonray Kojima

[57] ABSTRACT

In an electromagnetic flow meter converter comprising a deviation amplifier for amplifying the deviation between a feedback signal and an input signal from a flow rate detector, and a converter circuit for converting the amplified output of the deviation amplifier into a frequency signal, the improvement comprising a frequency divider for frequency dividing the frequency signal, a digital setting unit for setting the frequency dividing factor of the frequency divider, and a multiplier for multiplying the output of the frequency divider by a comparison voltage which is proportional to the current applied to the coil of the flow rate detector to provide the feedback signal, whereby the span is set digitally and whereby the compatibility between the converter and the flow rate detector is obtained by setting the product of the meter constant of the flow rate detector and a predetermined maximum flow velocity. A second embodiment uses an oscillator, frequency dividers and multipliers to adjust and expand the range of zero adjustment to a value lower than 0% and to prevent mutual interference between the zero adjustment and span adjustment.

8 Claims, 7 Drawing Figures (A) $F_{i3}$ (B) $F_{03}$ (A) $F_{04}$
(B) 1/2 – FREQ. DIVISION
(C) $1/2^2$ – FREQ. DIVISION
(D) $1/2^3$ – FREQ. DIVISION

ELECTROMAGNETIC FLOW METER CONVERTER

BACKGROUND OF THE INVENTION.

1. Field of Invention.

This invention relates to an electromagnetic flow meter converter (hereinafter called "converter") which amplifies and converts a deviation of a feedback signal from an input signal, into a frequency signal, and further converts the frequency signal into the feedback signal; and more particularly, to improvements in the span setting portion of the converter.

2. Description of Prior Art.

FIG. 1 shows an example of a conventional converter which employs a scheme to attain compatibility between the converter and a detector used therewith. In FIG. 1, to an input terminal 10, an input signal $e_i$ relating to a flow rate, is applied, which input signal is provided from an electrode of a detector (not shown). This input signal $e_i$ is amplified by an amplifier 11. The amplifier 11 has a variable gain so that a meter constant for compensation of variations of the characteristics of the detector can be set in the converter. A deviation of a feedback signal $e_f$ produced by a multiplier 12 from the output of amplifier 11 is amplified by a deviation (i.e. differential) amplifier 13. The output of deviation amplifier 13 is synchronous rectified by a synchronous rectifying circuit 14, into a DC voltage. This DC voltage is converted by a voltage-to-frequency converting circuit 15, into a frequency signal which has a certain pulse duration and whose frequency corresponds to the value of the DC voltage. This frequency signal is converted by a frequency-to-current converting circuit 16 into a DC current, which is outputted through an output terminal 17. The frequency signal from circuit 15 is also concurrently supplied to a frequency ratio converting circuit 18.

The frequency ratio converting circuit 18 comprises a delay circuit, frequency ratio selecting switch, counter, gate, etc, such as shown, for example, in Japanese Patent Publication 56-41944, "Signal Converter". The frequency output of frequency ratio converting circuit 18 is supplied to multiplier 12. A comparison signal $e_r$, which is proportional to an excitation current, is produced across a resistor connected in series with an exciting coil of the detector (not shown). This comparison signal $e_r$ is applied to multiplier 12 through a terminal 19. A multiplier 12 is formed, for example, by switching elements having turn-on/off action which is controlled according to the frequency output of frequency ratio converting circuit 18, and provides feedback signal $e_f$ which is proportional to the product of comparison signal $e_r$ and the frequency output.

The operation of the converter of FIG. 1 is as follows. Denoting the input frequency of frequency ratio converting circuit 18 by $F_{i1}$, the output frequency by $F_{o1}$, and a frequency dividing factor (a ratio) by $K_1$, the relation $$F_{o1} = K_1 F_{i1}$$

is obtained. Because comparison signal $e_r$ is sampled by multiplier 12 in accordance with output frequency $F_{o1}$, feedback signal $e_f$ can be written as $$e_f = F_{o1} e_r = K_1 F_{i1} e_r \quad (1)$$

with $m_f$ representing the meter constant, a coefficient $1/m_f$ for compensation of variations of a signal voltage relating to a flow rate to be detected by the detector, has been set in amplifier 11, so that the output of the amplifier 11 becomes $e_i/m_f$.

Because the circuit loop is designed as a whole so that output $e_i/m_f$ of amplifier 11 coincides with the feedback signal $e_f$, the following is obtained $$\frac{e_i}{m_f} = e_f = K_1 F_{i1} e_r \quad (2)$$

$$\therefore F_{i1} = \frac{1}{K_1 m_f} \cdot \frac{e_i}{e_r} \quad (3)$$

Letting the relation between frequency $F_{i1}$ and a current output $I_{o1}$ at the output terminal 17 be $$I_{o1} = \alpha F_{i1} \quad (4)$$

wherein $\alpha$ is a conversion constant, the following is obtained $$I_{o1} = \frac{\alpha}{K_1 m_f} \cdot \frac{e_i}{e_r} \quad (5)$$

Accordingly, by setting, in the respective cases, a set of frequency division factor $K_1$ and meter constant $m_f$, it is possible to change the extent of the span, while preserving compatibility between the converter and the detector.

FIG. 2 shows another example of a conventional converter which uses a scheme for permitting zero adjustment. In FIG. 2, input signal $e_i$ is amplified by an amplifier 20 and applied to an inverting input end $(-)$ of a deviation amplifier 22 through a resistor 21 for span adjustment. Between inverting input $(-)$ and the output end of deviation amplifier 22, a parallel circuit is connected, comprising a condenser $C_1$ and resistor $R_1$, and functions so as to smooth the input voltage. On the other hand, a noninverting input end $(+)$ of deviation amplifier 22 is connected to a common potential COM. The output end of amplifier 22 is connected to a synchronous rectifying circuit 23, so that a signal is synchronous rectified in synchronous rectifying circuit 23 and applied to an integrator 24.

The output of integrator 24 is converted by a voltage-to-frequency converting circuit 25, into a frequency signal $F_{i2}$. This frequency signal $F_{i2}$ is applied to a pulse width circuit 26 by which its pulse duration is made uniform, and serves to turn ON and OFF a switch SW1.

The comparison voltage $e_r$ is applied to one end of switch SW1 and switches ON and OFF in accordance with the output pulse of pulse width circuit 26. The resultant output is fed back negatively through a resistor 27 to inverting input $(-)$ of deviation amplifier 22, so that the input voltage of deviation amplifier 22 will become zero. Accordingly, there is obtained an output whose frequency $F_{i2}$ corresponds to input signal $e_i$. This frequency signal $F_{i2}$ is converted into a current output $I_{o2}$ by, for example, a frequency to current converting circuit 28 and appears at output terminal 17. A zero point adjustment can be made with respect to a span being set, by voltage dividing comparison voltage $e_r$ and applying the obtained voltage through a resistor 29 for zero point adjustment to the inverting input (−) of deviation amplifier 22.

The conventional technique shown in FIG. 1, has the following deficiencies and disadvantages.

1. Because the frequency ratio converting circuit used to set the span of the converter comprises delay circuit, gate, and binary or decimal counter, etc, its configuration is complicated. In particular, since a high degree of accuracy is required increasingly in the field of electromagnetic flow meters, the setting of the span with a degree of precision not exceeding 0.1% is desired and a setting circuit which can handle a four digit decimal number is now needed. Thus, a span setting circuit becomes complicated if formed by use of counters, as is done in the prior art.

2. In the electromagnetic flow meter, the output signal of the detector varies in magnitude slightly from detector to detector. Thus, in order to prevent a span error from arising in case any detector and converter are paired, the meter constant representing the extent of variation of the signal voltage given by the detector is determined for each detector and the gain of the first stage amplifier of the converter is adjusted according to the meter constant peculiar to the incorporated detector. Under such circumstances, to adjust the gain of the amplifier 11, an analog voltage dividing circuit, such as a potentiometer is needed. Thus, it is difficult to provide a degree of precision which does not exceed the desired 0.1%.

With respect to the conventional technique used in FIG. 2, other deficiencies and disadvantages occur.

3. The span is changed by adjusting resistor 21. Thus, the degree of accuracy in setting the span depends upon the degree of precision of resistor 21. Accordingly, it is necessary to set the value of resistance accurately. However, this procedure has a distinct limitation in that it is an analog type of adjustment system.

4. Because of the foregoing procedure of setting the span, current output $I_{o2}$ is required to be adjusted and made 0% when frequency $F_{i2}$ is zero, and this current output $I_{o2}$ does not decrease beyond 0%, even if resistor 29 is adjusted and its value of resistance is set to a value lower than that corresponding to 0%. Thus, it is difficult, with the prior converter, to adjust the zero point.

Thus, it can be appreciated that the prior art has a variety of deficiencies and disadvantages and leaves much to be improved upon.

SUMMARY OF THE INVENTION

Accordingly, an object of the invention is to overcome the aforementioned and other deficiencies and disadvantages of the prior art.

Another object is to provide a digital setting system by which the span of the converter can be set with a high degree of precision.

A further object is to provide a system by which adjustment of the zero point is achieved easily without causing interference between the setting of the span and the adjustment of the zero point.

A still further object is to provide a converter which is compatible with any detector which might be used therewith.

The foregoing and other objects and features are attained by the invention which encompasses an electromagnetic flow meter converter comprising a deviation amplifier for amplifying a deviation of a feedback signal from an input signal, a converting circuit for converting the output of the deviation amplifier into a frequency signal, a first frequency divider for frequency dividing the frequency signal, a digital setting unit for setting a frequency division factor of the first frequency divider, and a first multiplying means for multiplying the output of the first frequency divider by a comparison voltage, to provide the feedback signal.

To adjust and expand the range of zero adjustment to a value which is lower than 0% without causing mutual interference between zero adjustment and span adjustment, the converter further includes an oscillator, a second frequency divider for frequency dividing the output frequency of the oscillator, and a second multiplying means for multiplying the output of the second frequency divider by a zero point voltage relating to the comparison voltage to add the results to the feedback signal, with the digital setting unit setting the same frequency division factor in the first and second frequency divider.

DETAILED DESCRIPTION OF PREFERRED EMBODIMENTS

Figure 1:
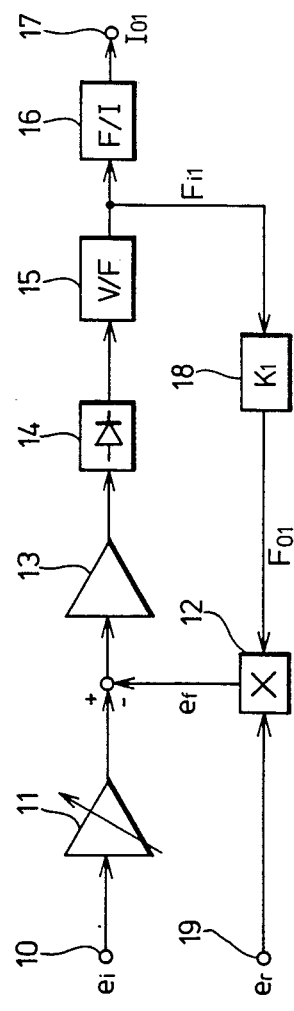
FIG. 1 is a block diagram depicting a conventional converter using means for attaining compatibility between the converter and a detector used therewith.
Figure 2:
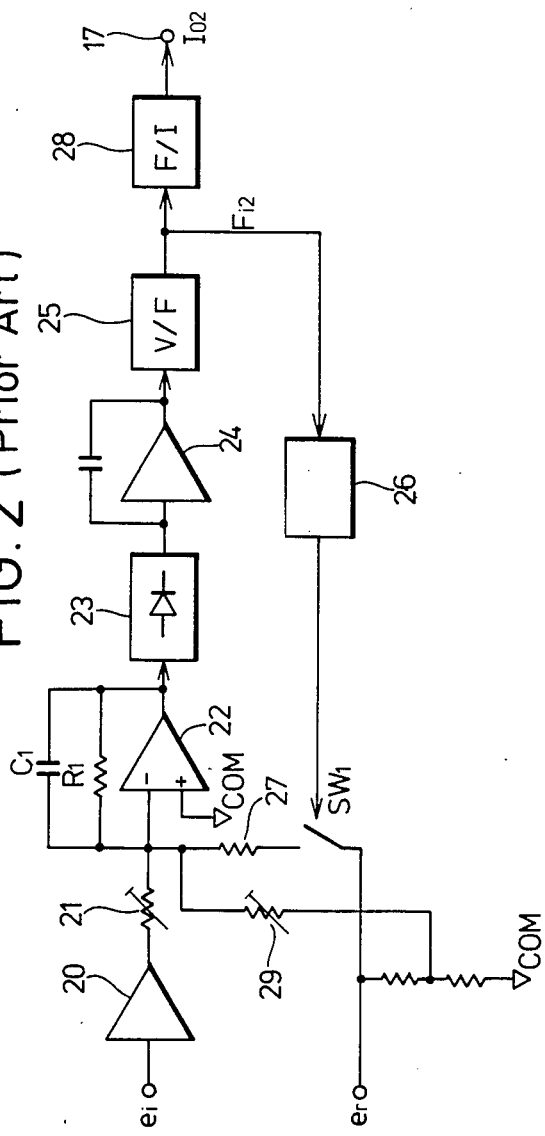
FIG. 2 is a block diagram depicting another conventional converter using means for permitting zero adjustment.

The embodiments shown in FIGS. 3–7 have circuit element having the same functions as those shown in FIGS. 1,2, and bear the same reference numerals, which for convenience of description will not be further described hereat.

Figure 3:
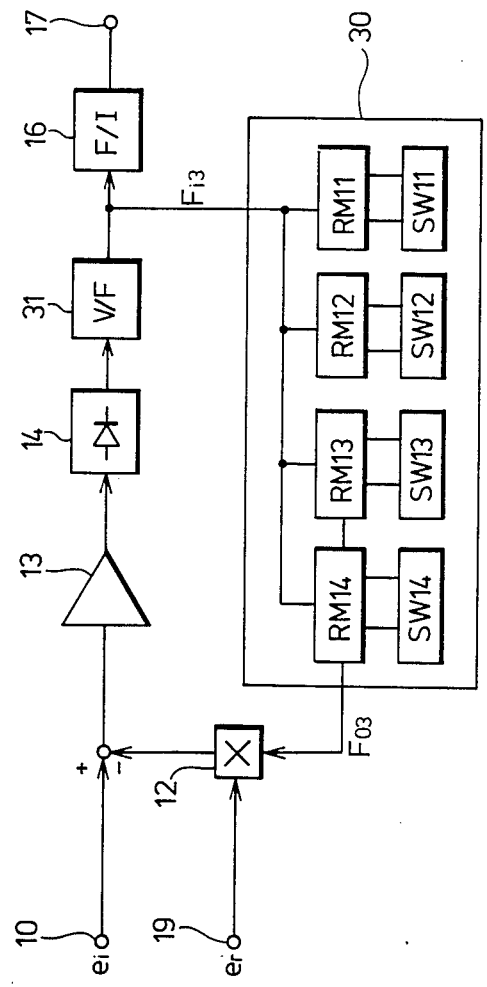
FIG. 3 is a block diagram depicting an illustrative embodiment of the invention, wherein a digital setting of a span is achieved.

In FIG. 3, block unit 30 indicates a span setting unit which can digitally set a span. The setting unit 30 divides input frequency $F_{i3}$ obtained from a voltage to frequency converter circuit 31, in accordance with a setting value to provide an output frequency $F_{o3}$.

Specifically, the span setting unit 30 comprises four decimal rate multipliers (i.e. frequency dividers) RM11 to RM14 and four switches SW11 to SW14, and can divide the input frequency $F_{i3}$ by a four digit frequency demultiplication (i.e. dividing factor or ratio (1 to 9,999). Namely, it can provide an output whose frequency ranges from one ten-thousandths (1/10,000) to ninety-nine hundred ninety nine ten-thousandths (9,999/10,000) of the input frequency. To set the frequency division factor in the setting unit 30, setting switches SW11 to SW14, functioning as digital setting elements, are coupled to corresponding multipliers RM11 to RM14, by which each number of four decimal digits $10^4$, $10^3$, $10^2$ and $10^1$, can be set.

To ensure compatibility between a detector (not shown) and the converter, the embodiment of FIG. 3 permits setting of a value which corresponds to the product of a given full scale velocity of flow and a meter constant of the detector used with the converter, by means of the setting switches SW11 to SW14. That is, it is also possible to digitally set the meter constant by means of the illustrative converter.

Figure 4:
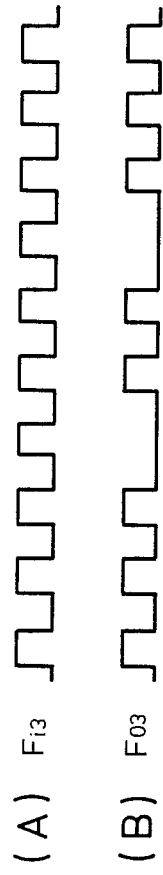
FIG. 4 is a waveform diagram depicting input and output waveforms of a span setting unit of the embodiment of FIG. 3.

FIG. 4 shows the input and output frequency waveforms of the span setting unit 30. FIG. 4, line (A) shows the input frequency $F_{i3}$ waveform. FIG. 4, line (B) shows the output frequency $F_{o3}$ waveform.

If data input S to be set in the four digit rate multiplier is selected, for example, as S=1234, in comparison with the input frequency ($F_{i3}$) waveform of FIG. 4, line (A) containing 10,000 pulses in a given interval, the output frequency $F_{o3}$ contains 1234 pulses (i.e. $F_{o3}$=1234) and shows a train of pulses, as shown in FIG. 4, line (B) which has empty tooth positions. Apparently, because the output waveform of the frequency divider becomes a train of pulses with some empty tooth positions, an ON and OFF ratio of pulses after frequency division, decreases in comparison to the before frequency division, in proportion to the number of empty pulse positions.

In this way, according to the embodiment of FIG. 3, a digital type span setting unit which is simple in configuration, is low priced and is settable to any desired frequency division factor, can be obtained by suitably connecting decimal frequency divider segments and corresponding setting switches, with the number of digits being selected as desired.

Figure 5:
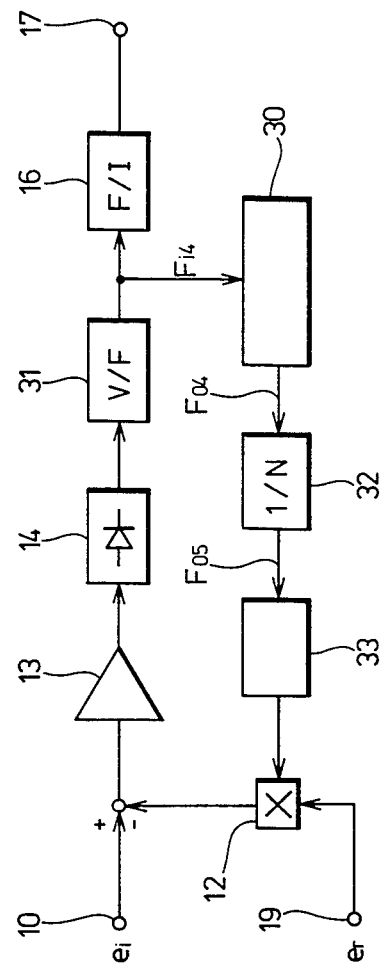
FIG. 5 is a block diagram depicting another illustrative embodiment wherein the embodiment of FIG. 3 is modified.

FIG. 5 is a block diagram showing a modification of the converter of FIG. 3, wherein an output frequency $F_{o4}$ produced by dividing an input frequency $F_{i4}$ by means of the span setting unit 30 shown in FIG. 3 is further divided by means of a frequency dividing circuit 32 in accordance with the number 1/N into $F_{o5}$. This output $F_{o5}$ is converted into a train of pulses having a certain duration, by a pulse width (in terms of duration) circuit 33 which may be formed by a one shot multivibrator circuit, for example. The resultant pulse train is multiplied by comparison signal $e_r$ from terminal 19, in multiplier 12.

Although the embodiment of FIG. 3, which includes the frequency divider as the span setting unit 30, produces the output frequency shown in FIG. 4, line (B) which is a pulse train having discrete and dense portions due to empty pulse positions, and results in fluctuations in the output, the embodiment of FIG. 5, is improved in the manner as discussed below on this point.

Figure 6:
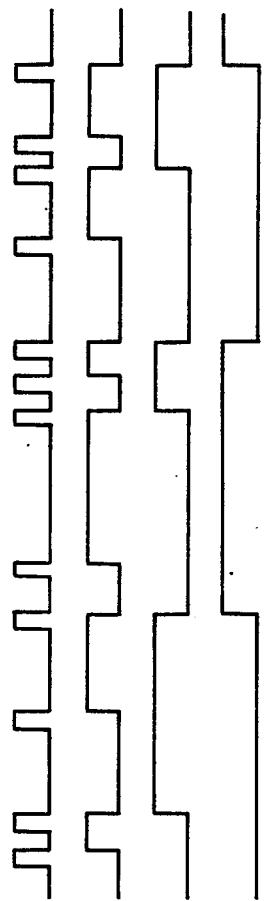
FIG. 6 is a waveform diagram depicting waveforms appearing at various parts of the embodiment of FIG. 5.

FIG. 6 is a waveform diagram illustrating the effects of the frequency division process performed by the converter shown in FIG. 5. FIG. 6, line (A) shows output frequency $F_{o4}$ of span setting unit 30. FIG. 6, line (B), line (C), line (D) show output frequency $F_{o5}$ waveforms of the frequency dividing circuit 32. In particular, the waveform of line (B) corresponds to the case of ½ frequency division. The waveform of line (C) corresponds to the case of ½² frequency division. The waveform of line (D) corresponds to the case of ½³ frequency division. As is apparent from these waveforms, the output assumes gradually a certain period with an increase of the frequency dividing factor. Accordingly, fluctuations of the output decrease with the use of the frequency dividing circuit.

Figure 7:
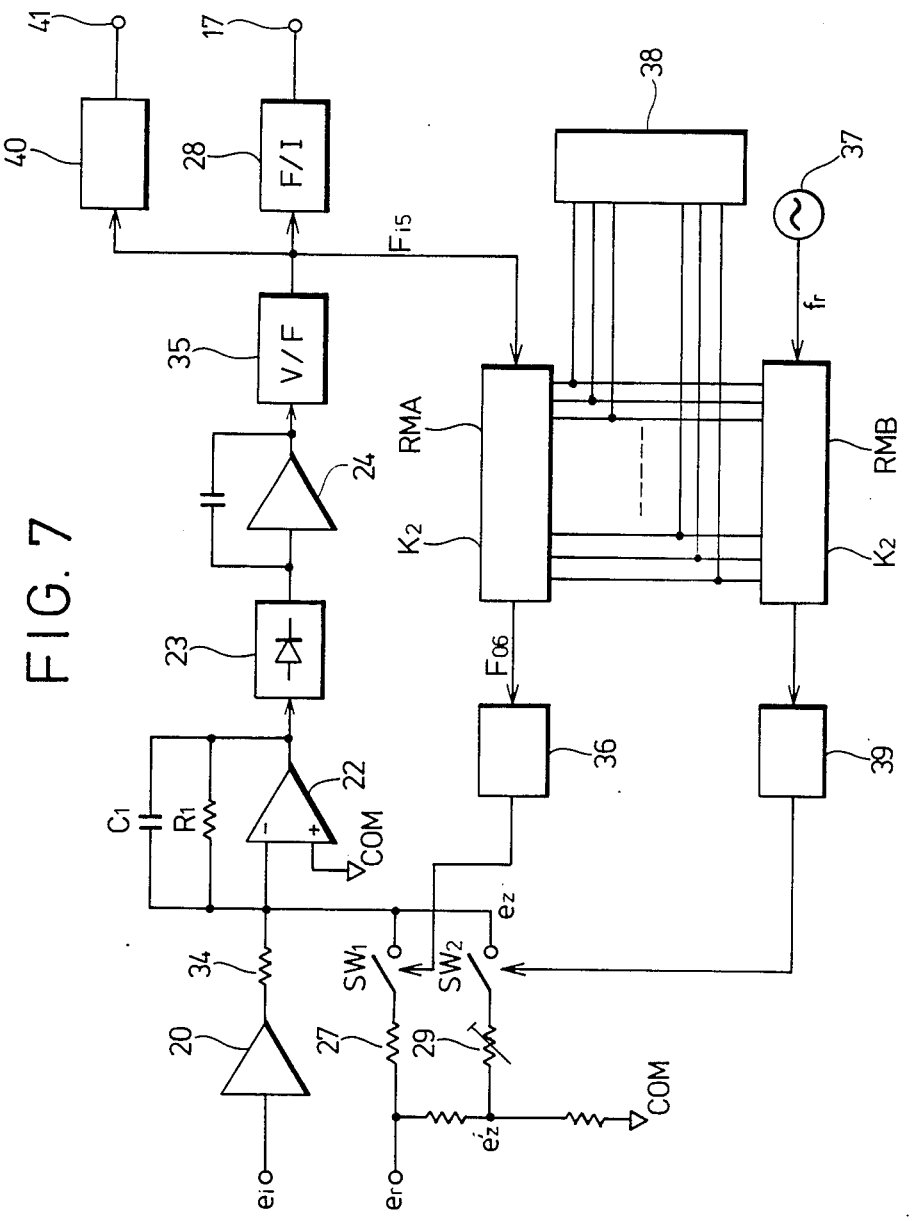
FIG. 7 is a block diagram depicting another illustrative embodiment wherein no interference between zero point adjustment and span setting is achieved.

FIG. 7 is a block diagram showing another illustrative embodiment of the invention, wherein deviation amplifier 22 receives at its inverting input (−) the sum of the input signal amplified in amplifier 20 and supplied through a resistor 34, a voltage for zero adjustment produced by voltage dividing the comparison voltage $e_r$ and supplied through resistor 29 and switch SW2, and the feedback voltage supplied through switch SW1. The output of deviation amplifier 22 is converted into a DC voltage by synchronous rectifying circuit 23. This resultant DC voltage is converted into a frequency signal $F_{i5}$ through integrator 24 and subsequently by a voltage to frequency converting circuit 35. A frequency divider unit RMA can accommodate four digits, for example, and divides the input frequency $F_{i5}$ applied by V/F circuit 35, to apply the results to a pulse width circuit 36. Pulse width circuit 36 makes uniform the pulse duration of the output frequency $F_{o6}$ of frequency divider unit RMA, to provide a control signal for turning ON and OFF switch SW1.

There is provided another rate multiplier unit RMB, to which a certain reference frequency $F_r$ is applied from an oscillator 37, for example. A frequency dividing factor for determination of the span, which is identical to a frequency division factor $K_2$, is set in by means of a digital setting unit 38. The divided frequency signal given from RMB is changed to a pulse train through a pulse width circuit 39 to turn ON and OFF switch SW2.

To one end of switch SW2, a voltage $e_z'$ is applied for zero adjustment which is produced by dividing the comparison voltage $e_r$.

From the embodiment of FIG. 7, a zero adjustment voltage $e_z$ is given by $K_2 f_r e_z'$. Assuming for simplicity that the gain is 1, then, the following relation holds at the input end of deviation amplifier 22.

$$e_i + e_z = K_2 F_{i5} e_r \quad (6)$$

Using the relation $e_z = K_2 f_r e_z'$, the following is then obtained.

$$F_{i5} = \frac{1}{K_2} \cdot \frac{e_i}{e_r} + \frac{e_z' f_r}{e_r} \quad (7)$$

The first term on the right is one proportional to the input signal $e_i$, whereas the second term does not depend on frequency division factor $K_2$, but is determined by zero adjustment voltage $e_z$. As a result, interference between span adjustment and zero adjustment is eliminated.

Furthermore, to permit expansion of a variable range of zero adjustment toward a lower value than 0%, value $e_z$ is set so that frequency $F_{i5}$ assumes a given value $f_o$ when input signal $e_i$=0. That is, by setting $e_i$=0 and $F_{i5}$=$f_o$ in equation (7), the the following is obtained $$f_o = \frac{e_z f_r}{e_r} \quad (8)$$

This indicates that the above relation does not depend on the frequency demultiplication factor $K_2$.

Accordingly, there is no interference between span adjustment and zero adjustment. The span can be set digitally at a high degree of precision. Also, accurate setting of the zero point can be achieved.

Output value $f_o$ corresponding to input signal $e_i$=0 of the voltage to frequency converting circuit 35 is deducted from output value f corresponding to input signal $e_r \neq 0$ by a deduction circuit 40. Then, at output terminal 41, there is provided a pulse output corresponding to the input signal.

Furthermore, this embodiment shows that the exciting current is stable. The comparison signal $e_r$ can be replaced by a fixed voltage supplied from a voltage source independent of the exciting source.

The invention accordingly has many advantages. For example, because the digital type span setting unit is included in the feedback circuit of the converter, to frequency demultiply the frequency signal, and the product of the meter constant of the detector and the full scale velocity flow, is set in the digital setting unit, the scan can be set at a high degree of precision, and the compatibility can be secured between the detector and converter all with a single circuit configuration. Furthermore, because there is no need to use a combination of analog circuit and digital circuit. the configuration of the inventive converter is considerably simplified.

Moreover, advantageously, because the same group of switches permits setting of the span and insures compatibility of the converter with the detector, the invention is economical. Furthermore, advantageously, because the two routes, each including the frequency divider unit, are provided and the same frequency division factor is given from the digital setting unit to the respective routes, through switching, thereby changing relatively the feedback voltage and zero adjustment voltage, the span can be altered by means of a digital system of high precision, the range of zero adjustment can be adjusted and expanded to a value which is lower than 0% and interference between zero adjustment and span adjustment is prevented. These results were not obtainable with the prior art arrangements.

The foregoing description is illustrative of the principles of the invention. Numerous modifications and extensions would be apparent to the worker skilled in the art. All such modifications and extensions are to be considered to be within the spirit and scope of the invention.

What is claimed is:

1. An electromagnetic flow meter converter comprising
    a deviation amplifier for taking from a flow rate detector an input signal representing flow rate and a feedback signal and then amplifying a deviation between said feedback signal and said input signal and for providing an amplified output;
    a converter circuit for converting said amplified output of said deviation amplifier into a frequency signal;
    a first frequency divider for frequency dividing said frequency signal and for providing a frequency divided output;
    a digital setting unit for setting a frequency dividing factor for said first frequency divider; and
    a first multiplying means for multiplying said frequency divided output of said first frequency divider by a comparison voltage which is proportional to current applied to a coil in said flow rate detector, to provide said feedback signal; wherein the product of a meter constant of said flow rate detector and a predetermined maximum velocity of flow is set in said digital setting unit.

2. The converter of claim 1, wherein said first frequency divider is a decimal frequency divider.

3. The converter of claim 1, wherein further comprising a frequency dividing means for converting said frequency divided output of said first frequency divider, into a train of pulses having a substantially uniform pulse duration, and for supplying said pulse train to said first multiplying means.

4. An electromagnetic flow meter converter comprising
    a deviation amplifier for taking from a flow rate detector an input signal representing flow rate and for amplifying a deviation between said feedback signal and said input signal for producing an amplified output;
    a converting circuit for converting said amplified output of said deviation amplifier into a frequency signal;
    a first frequency divider for frequency dividing said frequency signal and for producing a first frequency divided output;
    a first multiplying means for multiplying said first frequency divided output of said first frequency divider by a comparison voltage which is proportional to current applied to a coil in said flow rate detector to provide said feedback signal;
    an oscillator for generating a referency frequency;
    a second frequency divider for frequency dividing said reference frequency and for providing a second frequency divided output;
    a second multiplying means for multiplying said second frequency divided output of said second frequency divider by a zero point voltage relating to said comparison voltage to provide an output to be added to said feedback signal; and
    a digital setting unit for setting the same frequency dividing factor in said first frequency divider and in said second frequency divider.

5. The converter of claim 4, wherein said first and second frequency dividers include decimal frequency dividers.

6. The converter of claim 4, further comprising a pair of frequency dividing means for converting each output of said first and second frequency dividers into a train of pulses having a substantially uniform pulse duration and for supplying each pulse train to said corresponding first and second multiplying means.

7. The converter of claim 4, wherein the product of a meter constant of a flow rate detector for detecting a flow rate and a predetermined maximum velocity of flow, is set in said digital setting unit.

8. The converter of claim 4, wherein a pulse output is obtained through a subtraction circuit by subtracting a certain value from the output pulse of said voltage to frequency converting circuit.

* * * * *